(12) United States Patent
Clark (10) Patent No.: US 10,342,302 B2
(45) Date of Patent: Jul. 9, 2019

(54) CHARM AND LINK BRACELETS, NECKLACES, AND BACK-PACKS WITH MEDICAL IDENTIFICATION FEATURES

(71) Applicant: Carmille R. Clark, Temple Hills, MD (US)

(72) Inventor: Carmille R. Clark, Temple Hills, MD (US)

( * ) Notice: Subject to any disclaimer, the term of this patent is extended or adjusted under 35 U.S.C. 154(b) by 263 days.

(21) Appl. No.: 14/545,636

(22) Filed: Jun. 1, 2015

(65) Prior Publication Data

US 2016/0345689 A1    Dec. 1, 2016

(51) Int. Cl.

| | |
|---|---|
| A44C 5/00 | (2006.01) |
| A44C 15/00 | (2006.01) |
| G09F 3/00 | (2006.01) |
| G06K 19/06 | (2006.01) |

(52) U.S. Cl.
CPC .......... A44C 5/0015 (2013.01); A44C 15/005 (2013.01); G06K 19/06037 (2013.01); G09F 3/005 (2013.01)

(58) Field of Classification Search
CPC .......... A44C 5/005; A44C 25/007; A44C 5/02; A44C 5/10; A44C 15/005; A44C 11/00; G09F 3/005
See application file for complete search history.

(56) References Cited

U.S. PATENT DOCUMENTS

| 3,372,500 | A | * | 3/1968 | Bernard | A44C 5/0015 |
| | | | | | 283/900 |
| 5,877,742 | A | * | 3/1999 | Klink | G06F 19/323 |
| | | | | | 345/685 |
| 6,223,559 | B1 | * | 5/2001 | Coleman | A44C 15/0015 |
| | | | | | 40/455 |
| 8,677,575 | B1 | * | 3/2014 | Bergstrom | A44B 11/266 |
| | | | | | 24/615 |
| 2003/0106336 | A1 | * | 6/2003 | Gaskill | A44C 5/0023 |
| | | | | | 63/3 |
| 2008/0016738 | A1 | * | 1/2008 | Talbott | A44C 5/0023 |
| | | | | | 40/633 |
| 2010/0077797 | A1 | * | 4/2010 | Gordon | H04N 21/41407 |
| | | | | | 63/1.11 |
| 2012/0069511 | A1 | * | 3/2012 | Azera | G06F 1/163 |
| | | | | | 361/679.03 |

(Continued)

Primary Examiner — Abigail E Troy
(74) Attorney, Agent, or Firm — John Richardson (57) ABSTRACT

The prime objective of the invention is a medical identification charm bracelet, necklace or equal jewelry adornments that incorporates link connections with charms, sport team symbols, information attachments attached, and wherein a cartoon or equal well recognized symbol or character in high gloss paint or equal preparation is displayed in the center of the bracelet, necklace with the user's personal medical information printed, engraved on the back. The character or sports symbol can be changed to suit the child's/user's/wearer's development stage and with every such purchase the symbol media corporation will issue an authentication certificate.

The invention provides for children with medical issues and allergies an easily identifiable medical information capability for public or emergency medical first responders, and in addition provides for wide range of high technology features in the form of GPS, audible/visual alarms, and two dimensional Quick Response bar-code.

6 Claims, 11 Drawing Sheets

(56) References Cited

U.S. PATENT DOCUMENTS

2013/0074543 A1* 3/2013 Vahid ................... A44C 15/00
                                                        63/1.11
2015/0213734 A1* 7/2015 Glickman ............... G09F 3/005
                                                        235/494

* cited by examiner

CHARM SYMBOL PURCHASE AUTHENTICATION CERTIFICATE FROM ISSUING ENTITY

NAME OF INDIVIDUAL USER :
DATE OF PURCHASE
VENDOR or RETAILER:
OWNER OF SYMBOL:

IT IS HEREBY CERTIFIED THAT THE ABOVE NAMED INDIVIDUAL USER PURCHASED THE PERSONALIZED DECORATIVE BRACELET OR NECKLACE CHARM SYMBOL WITH A RECOGNIZABLE SYMBOL FIGURE CUSTOMIZED WITH THE SYMBOL ON THE FRONT FACE AND PROVIDING SPECIFIC MEDICAL INFORMATION OF THE INDIVIDUAL ON THE REVERSE FACE.

VENDOR / RETAILER

CHARM AND LINK BRACELETS, NECKLACES, AND BACK-PACKS WITH MEDICAL IDENTIFICATION FEATURES

STATEMENT REGARDING FEDERALLY SPONSORED RESEARCH OR DEVELOPMENT

This application claims priority by a U.S. Provisional Application Nos. 61/457,899, with a Filing Priority Date of Jun. 30, 2011, 61/741,249, with a Filing Priority Date of Jul. 16, 2012, & 61/957,502 with a Filing Priority Date of Jul. 5, 2013, and 61/997,878 with a Filing Priority date of Jun. 12, 2014.

CROSS-REFERENCE TO RELATED TOPICS

Assignee: Not applicable

REFERENCE TO SEQUENCE LISTING IN A TABLE, OR A COMPUTER PROGRAM LISTING COMPACT DISK APPENDIX

Not applicable.

BACKGROUND OF THE INVENTION

The present invention generally relates to a decorative charm bracelet arrangement whereby the wearer provides immediate medical identification and information about a plurality of conditions affecting the wearer including specific personal data in the form of for example, name, age, next of kin, telephone numbers (both cell and land lines), parental email addresses, emergency contacts and primary physician's name address and telephone numbers.

Existing prior art examples have taken the form of identification cards attached to utilitarian lanyards made from inexpensive, cheap materials such as cotton, nylon and combinations thereof in the form of ball or beaded chain suspended from a person's neck, pocket, or lapel, badge clips, and student's dormitory key chains.

A few devices have been designed to meet similar needs. The devices shown for example, in U.S. Pat. No. 5,794,371—Camillery, U.S. Pat. No. 6,223,559—Coleman, U.S. Pat. No. 6,256,793—Arias et al, U.S. Pat. No. 6,263,702—Lo, U.S. Pat. No. 6,293,128—Leufray-Simms, and U.S. Pat. No. 7,257,967—Rheinstein, U.S. Pat. No. 7,323,998—Girvin et al, U.S. Pat. No. 7,849,619—Mosher Jr et al, U.S. Pat. No. 7,905,036—Howell, US 2003/0106336—Gaskill, US 2003/0150143—Hazard, US 2009/0113933—Hatem, and US 2011/0068926—Jong et al.

Prior art devices such as those disclosed above have several disadvantages with respect to personalizing the means of identification in a manner that is both decorative and informative.

The aforementioned prior art devices such as those disclosed above are adequate for the basic purposes for the specifically intended use, it is apparent that they are uniformly deficient with their capability to provide comprehensive, simple, efficient, and practical medical identification charm bracelet with respect to audible and visual identifications.

To address the particular limitations in the prior art, the instant invention provides a novel arrangement for combining an ornamental adornment in the form of a bracelet, necklace, broach, that provides life saving information about the wearer to enable any bystander to alert medical authorities in the event that the wearer is involved in an accident, or a medical emergency.

Therefore a comprehensive device was needed that would enable the wearer to provide medical information in a manner that will not embarrass or become cause the wearer to become uncomfortable when in the company of peers; this is considered to be of particular concern to minors and young adults.

BRIEF SUMMARY OF THE INVENTION

This invention allows the user to provide medical information in a readily retrievable manner by the use of attractive and decorative means in the form of wrist, ankle charm bracelets, necklaces, headbands, neckbands, ankle-bands, leg-bands, and garment accessories such as neckties, belts, and garters.

In a further embodiment of the instant invention user information can be incorporated in children's and youth accoutrements such as, Back Packs, Purses by the attachment of identifying appliqués denoting for example, Disney, Nickelodeon, and sports team logos.

The essence of the instant invention is to provide easy to use, versatile, simple of designs of medical information that is readily accessible, visually and audibly apparent and simple for the user to wear.

The various disclosed embodiments of the instant invention have been developed to satisfy the aforementioned needs in an efficient and economically feasible and practical manner. In particular, the instant invention provides for the user/wearer to display as a charm or linked bracelet a Cartoon Character in a high gloss paint finish in the center of the bracelet, or necklace with the user/wearer personal identification printed on the back of the charm or linked bracelet Cartoon Character. In this manner, the user/wearer postal address, telephone/cell phone numbers of next of kin, etc., can be readily displayed. In addition specific sports team logos for participating sports organizations, such as NBA, WNBA, NFL, NHL, MLS can be depicted in the same manner.

The Cartoon Characters in for example, from the Disney, Nickelodeon or similar children's media corporations cast of characters, can be changed with added links during the child's developmental stages and provide the child/user/wearer some measure of self identification, independence and self expression. In addition specific sports team logos for participating sports organizations, such as NBA, WNBA, NFL, NHL, MLS can be depicted in the same manner.

A prime feature of the instant invention can be described in that for every purchase of bracelet, necklace, charm attachment, each child/user/wearer will be in receipt of an authenticated corporation card (from Disney, Nickelodeon or equal child media corporation) which will provide additional detail information that can be attached to the child's/user's/wearer's personal back-pack, purse, kit-pack etc.

For added security to the child's/user's/wearer's well being, each bracelet, necklace or other personal adornment jewelry will be provided with a tamper resistant sturdy, closure clasp.

For further added security to the child's/user's/wearer's well being on each linked bracelet, necklace or other personal jewelry adornment, an adornment will be included to provide the child's/user's/wearer's particular medical condition, allergies, or specific medical condition and engraved on each link of the bracelet, necklace or other similar personal adornment.

In addition in further embodiments to the instant invention, for example, it can be arranged to incorporate a number of additional features and embodiments that enhance the wearer's capacity to relay important medical information to the public at large in an attractive, informative manner connecting with a variety of cognitive senses as described as follows:

- reusable or non-reusable identification device incorporating tamper resistant fastening for necklaces, bracelets.
- identification information incorporated in children's and youth accoutrements such as Back Packs and Purses denoting for example, Disney, Nickelodeon, and sports teams logos.
- medical identification information providing encoded biometric data such as fingerprints, retina scans, iris, blood, DNA, in the form of electronic chip data storage devices.
- the inclusion in the medical identification device of a bar-code that would contain additional medical and personal information about the user and wherein the bar-code, and Quick Response (QR) two dimensional bar codes are scanable to obtain additional health and personal information.
- means for providing biomedical monitoring functions using devices in contact with the user's skin whereby the user's state of health can be detected using electronic control circuits and data transmitting apparatus in the form of flexible electronic chips embedded in necklace or bracelet charms.
- use of RFID (Radio Frequency Identification) circuits embedded in necklace or bracelets charms whereby a transponder emits a wireless signal representative of medical information stored in the transponder and responsive to changes in the user's medical condition.

BRIEF DESCRIPTION OF THE DRAWINGS

Various features, aspects, and advantages of the present invention will become apparent with reference to the following FIGS. 1 to 19 accompanying this application.

FIG. 1 disclose examples of decorative charm characters in front view, and FIGS. 2 and 3 discloses bracelet, necklace side and end views respectively.

LIST OF REFERENCE NUMBERS FOR THE ELEMENTS IN THE DRAWINGS

Examples of bracelet, necklace link designs 10 with Charm Figure attachments 12 and tamper resistant Necklace or Bracelet clasp closure clasp 14.

Necklace or bracelet link designs 10 with Cartoon Character or Sports Team logo or shapes in presentation formats including high gloss paint, etched outlines, neon paint format, hologram pattern format or equal clearly visible pictorial presentation formats, on the front side 16 with the child's/user's/wearer's personal identification 18 printed, etched, etched and filled with reflective substances such as fluorescent paint, hologram pictorial representations of selected figures, and engraving or other clearly visible indicia marking formats, on the reverse side.

Alternative examples of bracelet, necklace link designs 10, 20 with Charm Figure attachments 12, Medical Alert symbols 52, and tamper resistant Necklace or Bracelet water-tight closure clasp 14 incorporating a USB portal 25.

Necklace or bracelet link designs 20 with Cartoon Character or Sports Team logo or shapes in high gloss paint or equal pictorial presentation format on the front side 16 with the child's/user's/wearer's personal identification 18 printed on the reverse side.

Necklace or bracelet link design 22 disclosing the user's specific allergy information.

Alternative necklace or bracelet link design 20 with links providing independent stand alone power supplies in the form of 21 dc.battery power and 23 solar cell power.

Alternative necklace or bracelet link design 20 including an embodiment 24 with an electronic chip attachment feature.

Alternative necklace or bracelet link design 20 including an embodiment 25 with an USB computer terminal portal feature.

Alternative necklace or bracelet link design 20 including an embodiment 26 with an RFID, antennae, or Infra Red attachment tag feature.

Alternative necklace or bracelet link design 20 including an embodiment 28 with a GPS attachment feature.

Alternative necklace or bracelet link design 20 including an embodiment 30 with a biomedical monitoring device attachment feature.

Alternative necklace or bracelet link design 20 including an embodiment 32 with an audible device attachment feature.

Alternative necklace or bracelet link design 20 including an embodiment 34 with a device attachment feature with visual alarm means.

Alternative necklace or bracelet link design 20 including an embodiment with a biomedical monitoring device attachment feature 36 with audible alarm means.

Alternative necklace or bracelet link design 20 including an embodiment 38 with an electronic chip embedded in an attachment feature.

Examples of bracelet, necklace link designs 10, and 20 including energy supply means in the form of dc battery supply 21 and solar cell power supply 23 for the purposes of powering design embodiments including items 24, 25, 26, 28, 30, 32, 34, 36, 38, 40, 42, 44, and 46.

Alternative necklace or bracelet link design 20 including an embodiment 40 with a bar code data scan able for downloading user medical information in an attachment feature.

Alternative necklace or bracelet link design 20 with a two dimensional Quick Response (QR) bar code data scan 42 able for downloading user medical information in an attachment feature.

Alternative necklace or bracelet link design 20 including an embodiment 44 with a biomedical monitoring device attachment feature with visual indications.

Alternative necklace or bracelet link design 20 including an embodiment 46 wherein a combined visual and audible alarm is actuated in the event that the user exhibits abnormal medical conditions.

Figure 19:
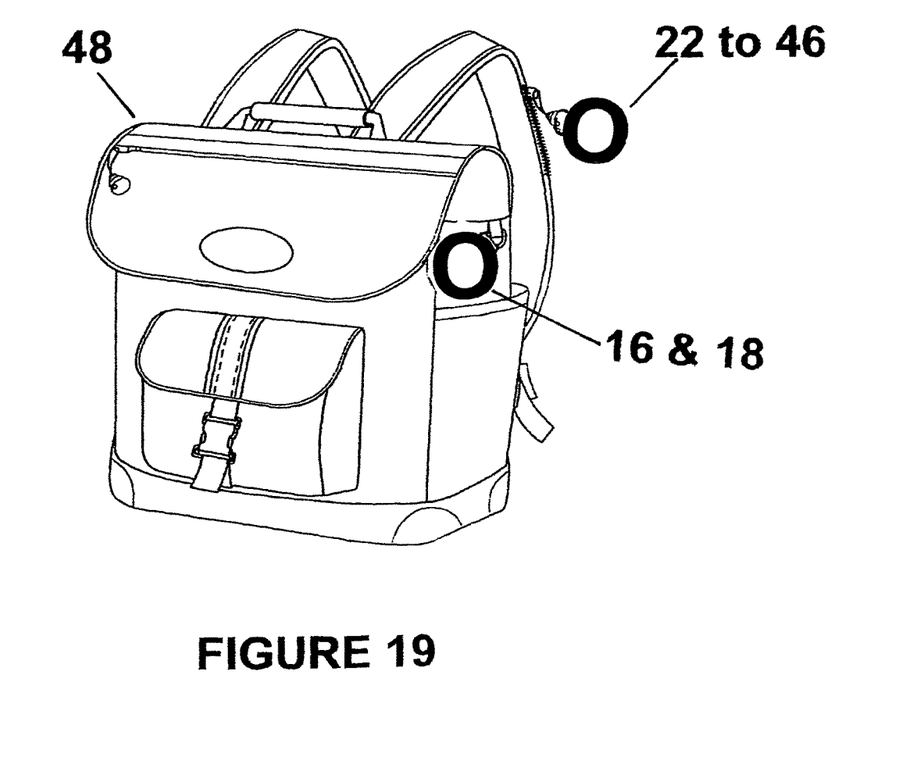
FIG. 19 provides an example of children's backpack, kit-pack, or purse 48 with embodiments incorporating a child's favorite Cartoon or Sports character 16 on one side of attached to for example, a Zipper Tab and with medical information 18 on the reverse side. In addition, FIG. 19 also discloses any one or any combination of the additional embodiments 21, 22, 23, 24, 25, 26 28, 30, 32, 34, 36, 38, 40, 42, 44, 46, attached for example, to a backpack, kit-pack or purse closure Zipper Tab.

Further example of the instant invention is incorporated in children's and youth accoutrements such as Back Packs, Kit-pack and Purses 48, denoting for example, Disney, Nickelodeon and sports team logos with embodiments incorporating a child's favorite cartoon or sports character 16 on one side of centrally placed figure and with medical information 18 on the reverse side.

Figure 20:
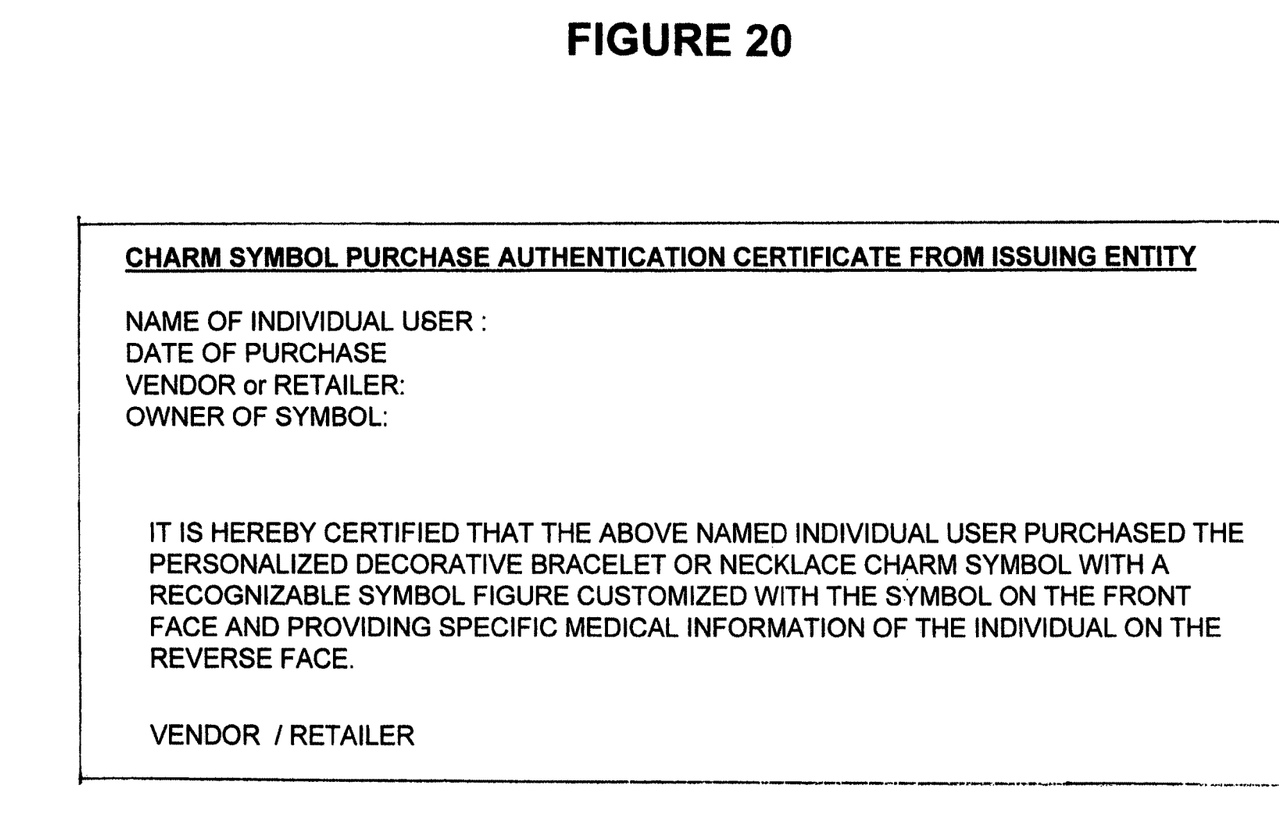
FIG. 20 discloses 50 the 'Charm Symbol Purchase Authentication Certificate from Issuing Entity'

For each purchase of the said charms 16 the organization owning, for example the Cartoon Character, or the Sports organization, will provide a card/certificate of authentication 50 providing additional personal information of the child/user/wearer.

In yet a further embodiment of the instant invention, children's Back Packs and Purses 48, can be provided with any additional attachments such as those described above in items 21, 22, 23, 24, 25, 26, 28, 30, 32, 34, 36, 38, 40, 42, 44, and 46.

I yet a further feature of the instant invention a 'Charm Symbol Purchase Authentication Certificate 50 is provided from the symbol issuing authority signifying that the symbol truly represents the an authentic version of the specific symbol.

The instant invention is novel in that the 'Charm Symbol Purchase Authentication Certificate 50 verifies the participation of the symbol issuing authority in the user's physical welfare program.

DETAILED DESCRIPTION OF THE INVENTION

The instant invention is novel in that it provides for a collection of physical charm designs 12 that can be easily attached to bracelets, necklaces 10, 20, and other personal adornments in combinations of charm designs and the means for monitoring changes in the physical condition of the user.

In particular, the instant invention provides for the user/wearer to display as a charm or linked bracelet a cartoon character in a high gloss paint finish in the center of the bracelet, or necklace with the user/wearer personal identification printed on the back of the charm or linked bracelet cartoon character.

In the instant invention, the user/wearer postal address, telephone/cell phone numbers of next of kin, etc., can be readily displayed.

Further in the instant invention, specific sports team logos of participating sports organizations) which will provide additional detail information that can be attached to the child's/user's/wearer's personal back-pack, purse, kit-pack etc.

The invention is comprised essentially of a variety of bracelet, necklace 10, 12, 20, and other personal wear adornments in a range of designs that incorporate both attractive 16 and useful medical information 18 about the user that is readily accessible to members of the public in the event of a change in the medical condition of the user.

In the instant invention, the cartoon characters 16 can for example, be derived from the Disney, Nickolodeon or similar children's media corporations cast of characters, can be changed with added links during the child's developmental stages and provide the child/user/wearer some measure of self identification, independence and self expression.

In the instant invention, specific sports team logos of participating sports organizations) will provide additional detail information that can be attached to the child's/user's/wearer's personal 48 back-pack, purse, kit-pack etc.

Similarly, in the instant invention, specific sports team logos of participating sports organizations) which will provide additional detail information that can be attached to the child's/user's/wearer's personal back-pack, purse, or kit-pack 48.

For each purchase of the said charms the organization owning the Cartoon Character will provide a card/certificate of authentication 50 providing additional personal information of the child/user/wearer.

In yet a further embodiment of the instant invention, the necklace and bracelet designs, 10, 20, and children's back packs, purses or kit-packs 48, can be provided with any additional attachments such as those described above in items 16, 18, 21, 22, 23, 24, 25, 26, 28, 29, 30, 32, 34, 36, 38, 40, 42, 44, and 46 as disclosed in the following:

1. A pictorial representation of the user's preference for a cartoon character or sports logo in a variety of formats including but not limited to enamel or fluorescent paint, etching, or hologram on the front side 16, and with user specific medical information on the reverse side 18.
2. A water tight bracelet or necklace closure clasp 14 with accommodation for a USB portal 29.
3. An embodiment 22 disclosing for example, the user's specific allergy information.
4. Embodiments in the form of dc. battery power 21 and solar cell power 23 supplies for powering items including 24, 26, 28, 30, 32, 34, 36, 38, 40, 42, 44 and 46.
5. An embodiment 24 with an electronic chip attachment feature for digitally transferring information relating to the user's medical information.
6. An embodiment 25 providing an USB computer terminal capability.
7. An embodiment 26 with an RFID, antennae or Infra Red tag attachment feature for transferring the user's medical information.
8. An embodiment 28 with a GPS attachment feature with the user's position information
9. An embodiment 30 with a biomedical monitoring device attachment feature.
10. An embodiment 32 with an audible device attachment feature.
11. An embodiment 34 with a device attachment feature with visual alarm means.
12. An embodiment with a biomedical monitoring device attachment feature 36 with audible alarm means.
13. An embodiment 38 with an electronic chip embedded in an attachment feature.
14. An embodiment 40 with a bar code data scan able for downloading user medical information in an attachment feature.
15. An embodiment providing a two dimensional Quick Response (QR) bar code data scan 42 able for downloading user medical information in an attachment feature.
16. An embodiment 44 with a biomedical monitoring device attachment feature with visual indications.
17. An embodiment 46 wherein a combined visual and audible alarm is actuated in the event that the user exhibits abnormal medical conditions.

For each purchase of the said charms from participating organizations with distinctive logos including but not limited to, sports teams in the NBA, WNBA, NFL, NHL, MLS, the individual sports organization/team administrative contacts will provide a card/certificate of authentication providing additional personal information of the child/user/wearer; providing additional personal information of the child/user/wearer.

The invention provides a vast variety of charm designs in a variety of shapes and sizes and a broad range of medical information means specifically relating to the user's medical conditions. The prime feature of the instant invention can be described in that for every purchase of bracelet, necklace, charm attachment, each child/user/wearer will be in receipt of an authenticated corporation card from a Cartoon Character (from Disney, Nickolodeon or equal child media corporation) and specific sports team logos of participating sports organizations) which will provide additional detail information that can be attached to the child's/user's/wearer's personal back-pack, purse, kit-pack etc.

The instant invention discloses a medical information bracelet comprising: a one piece continuous member in material in for example, elastic, comprises hypoallergenic elastomer and the elastomer is coated with a hypoallergenic material; wherein said bracelet further includes an individual's medical information affixed to said bracelet wherein said medical information comprises one of said individual's illnesses, medical history, condition, required medications, allergies, a personal physician or doctor, emergency contact information, or insurance information and wherein said information is affixed by stitching, embroidery, iron-on, coloring, screen printing, sewing on a badge, or a combination thereof.

The instant invention provides for a bracelet or necklace closure water tight seal clasp 14 selected from a range of designs including but not limited to spring clasps, hinge clasps, hooks, spiral rings, jump rings, or toggle clasps.

The instant invention further discloses that the closure clasp 14 or link 25, can incorporate a USB portal 29 capable of storing digital data and accessing from the user's internet account relating to the user's medical history information.

In addition, the instant invention provides the user to exhibit medical information in a readily retrievable manner by the use of attractive and decorative means in the form of a variety of other personal adornments such as wrist, ankle charm bracelets, headbands, neckbands, ankle-bands, leg-bands, and garment accessories such as neckties, belts, and garters.

The instant invention disclose a computer-implemented method for providing a medical alert system, providing a database for storing medical information for an individual user and associating the stored medical information with a barcode of the individual user and sending to a computing device over an internet network.

The instant invention discloses a system for identifying a person by means of attaching an identification apparatus to a person, the attachment means comprising a circuit configured to receive and store biometric information about the person when the circuit is in an active state, such that the circuit is configured to store new biometric information received from an external device after returning to the active state.

The invention provides a novel arrangement for combining an ornamental adornment in the form of a bracelet, necklace, broach, that provides life saving information about the wearer to enable any bystander, or member of the public to alert medical authorities, medical first responders in the event that the user/wearer is involved in an accident, or a medical emergency rendering the user/wearer incapacitated.

The instant invention provides an easy to use, versatile, simple array of designs of medical information that is readily accessible, audibly 32 and visually 34 and apparent and simple for the user to wear without in any way drawing attention to the presentation of the medical information means and avoiding causing any embarrassment to the user.

The invention can readily incorporate a number of features that enhance the wearer's capacity to relay important medical information to the public at large in an attractive, informative manner connecting with a variety of cognitive senses.

The invention is capable of incorporating reusable or non-reusable identification device incorporating tamper resistant fastening for necklaces, bracelets. The materials used in making these items include the form of sterling silver 14K and other similar types of metals.

The instant invention is capable of providing identification information incorporated in children's and youth accoutrements such as Back Packs and Purses, denoting Disney, Nickelodeon and sports team logos.

Figure 14:
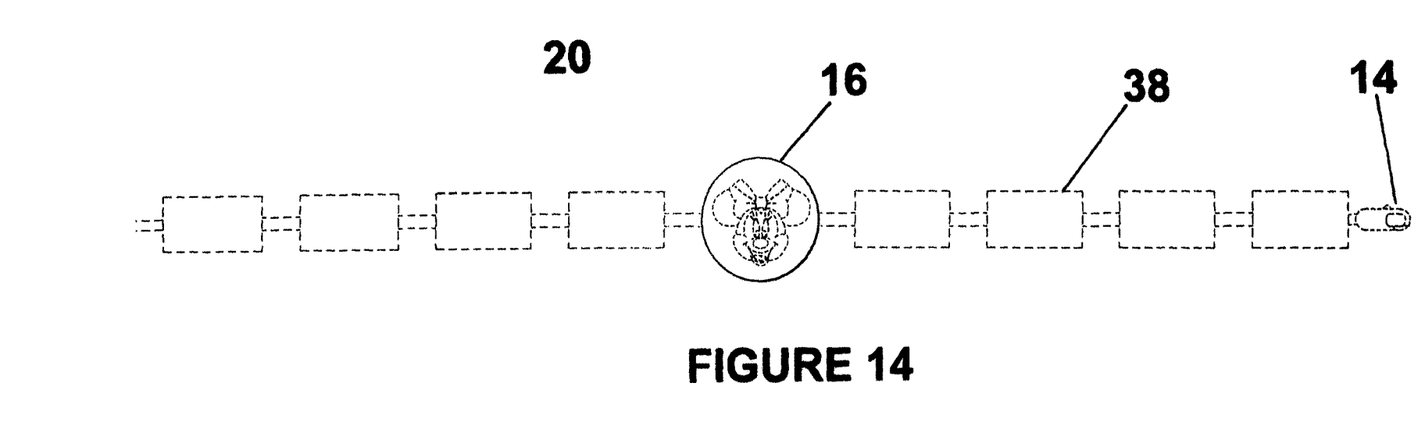
FIG. 14 provides an alternative bracelet or necklace link design 20 including an embodiment 38 wherein medical information identification is includes with an electronic chip.

The invention is capable of incorporating medical identification information providing encoded biometric data such as fingerprints, retina scans, iris, blood, DNA, in the form of electronic chip 38 data storage devices.

Figure 15:
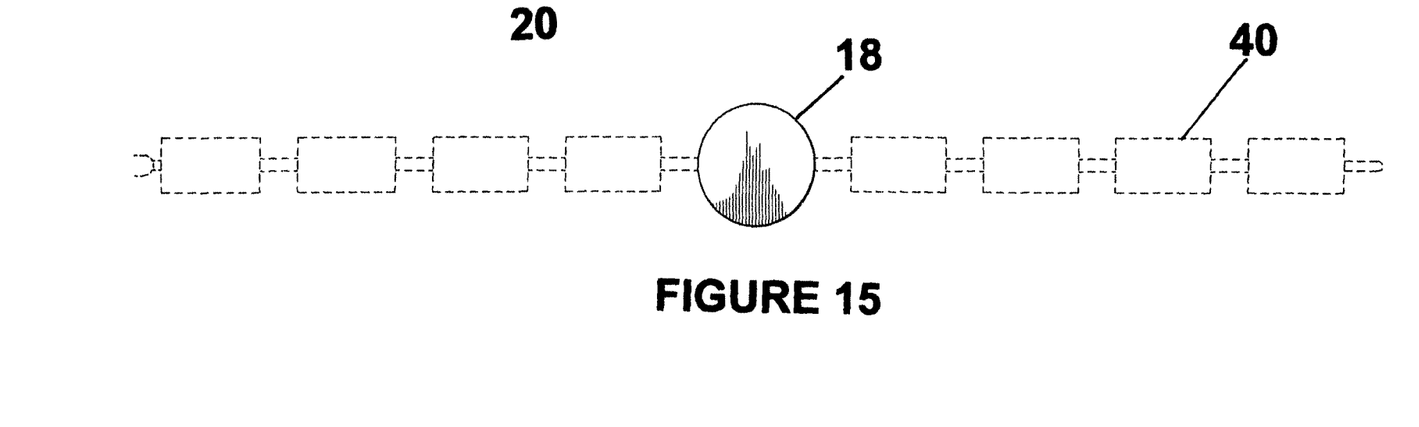
FIG. 15 provides an alternative necklace or bracelet link design 20 including an embodiment 40 with a bar code data scan able for downloading user medical information in an attachment feature.
Figure 16:
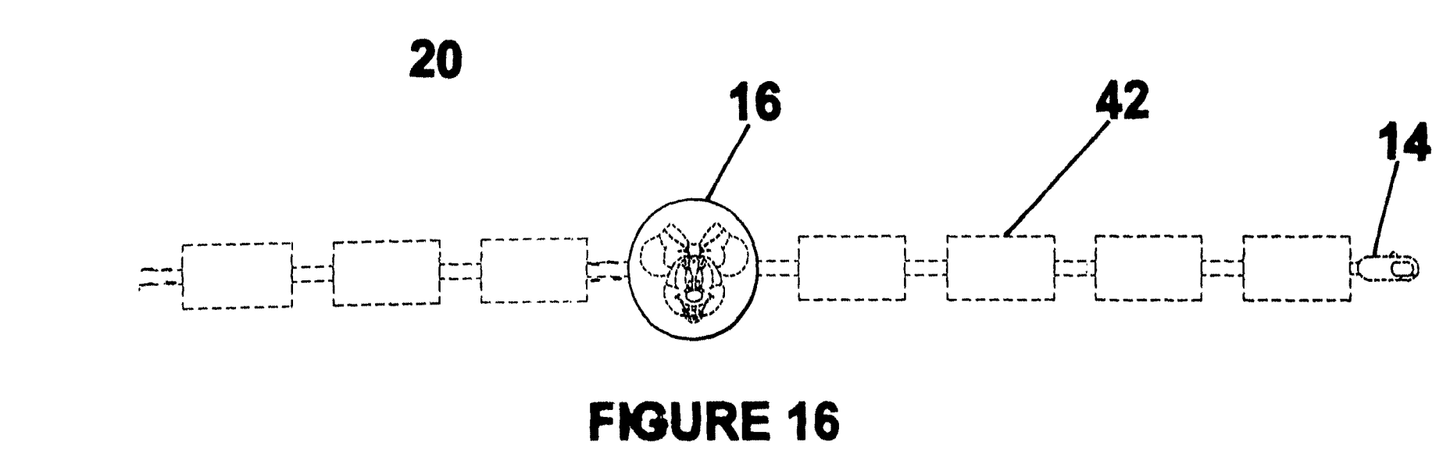
FIG. 16 provides an alternative necklace or bracelet link design 20 including an embodiment 42 with a two dimensional Quick Response (QR) bar code data scan able for downloading user medical information in an attachment feature.
Figure 17:
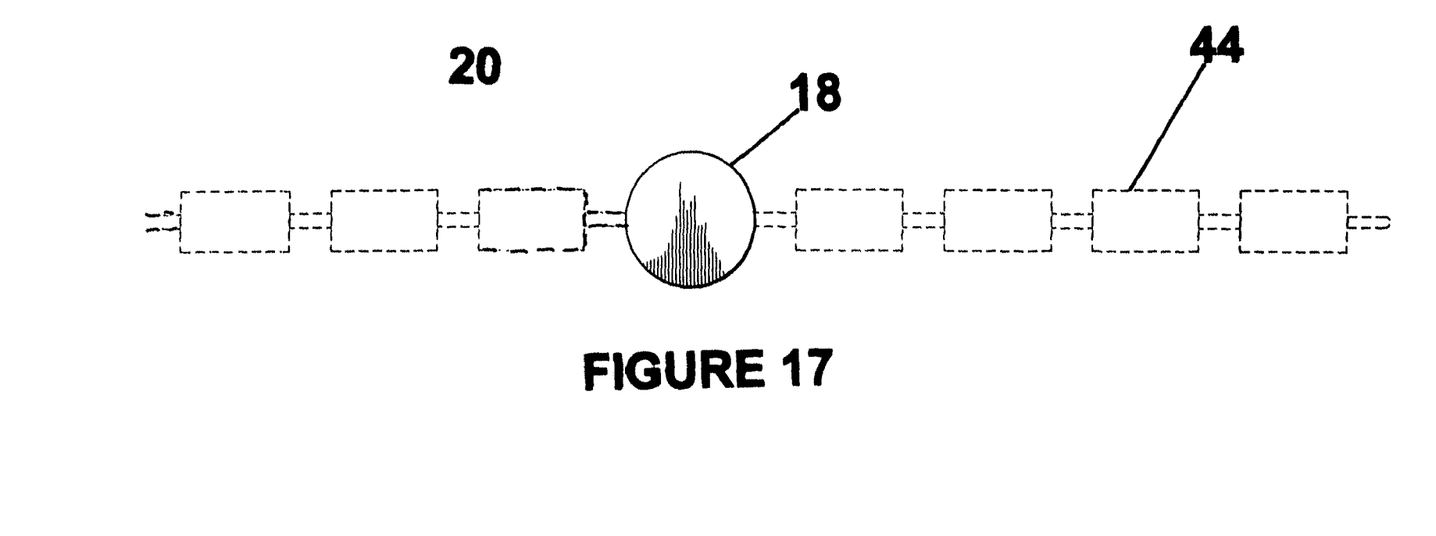
FIG. 17 provides an alternative necklace or bracelet link design 20 including an embodiment 44 with a biomedical monitoring device attachment feature with visual indications.
Figure 18:
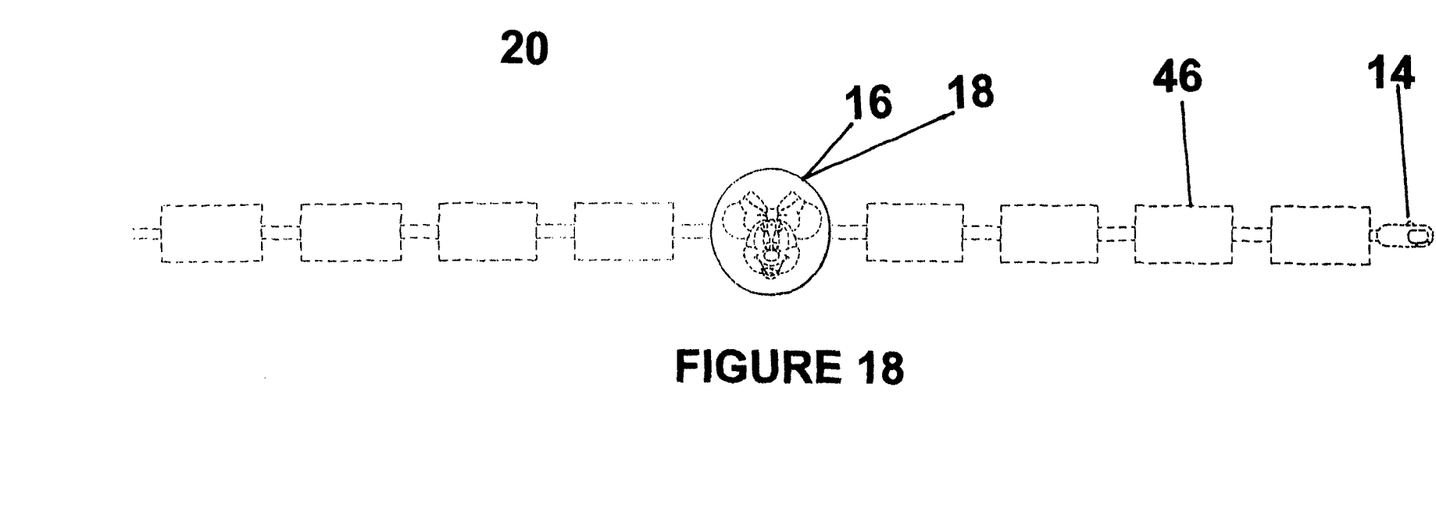
FIG. 18 Alternative necklace or bracelet link design 20 including an embodiment 46 wherein a combined visual and audible alarm is actuated in the event that the user exhibits abnormal medical conditions.

The invention in a further embodiment can provide medical identification devices with bar-code information that would contain additional medical and personal information about the user and wherein the bar-codes 40, 42, are scanable to obtain additional health and personal information.

Figure 9:
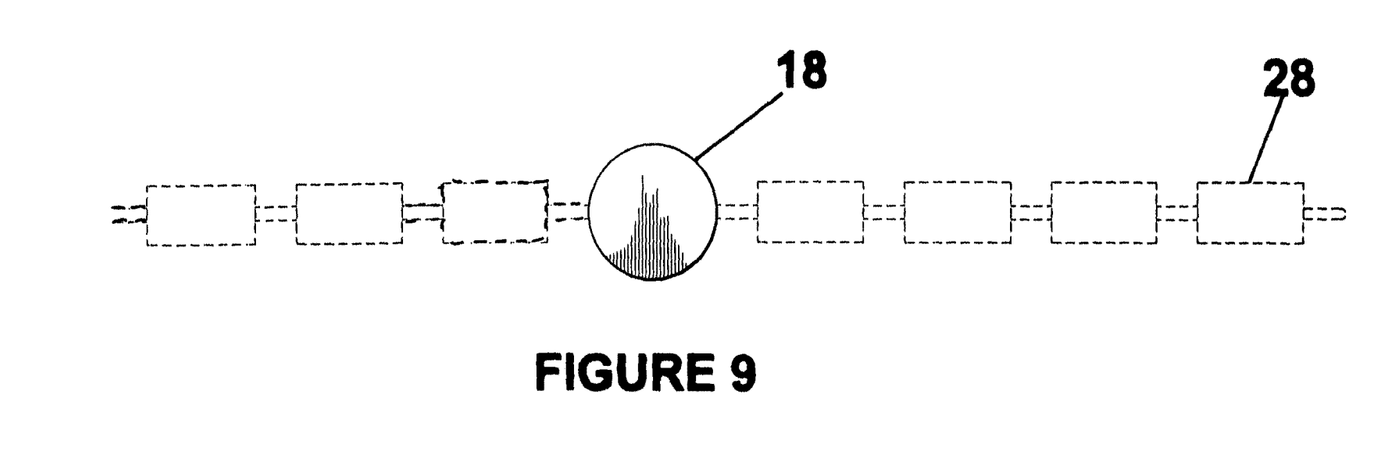
FIG. 9 provides alternative bracelet or necklace link design 20 including an embodiment for an USB computer portal 25, and GPS positioning 28 attachment.
Figure 10:
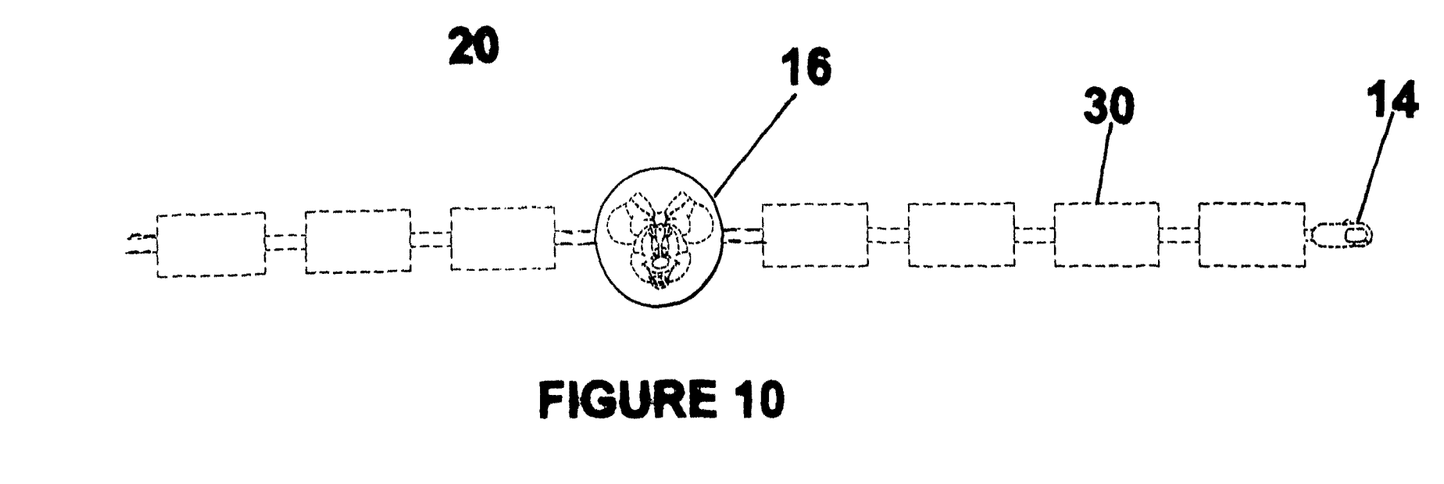
FIG. 10 provides alternative bracelet or necklace link design 20 including an embodiment 30 for biomedical monitoring device.
Figure 11:
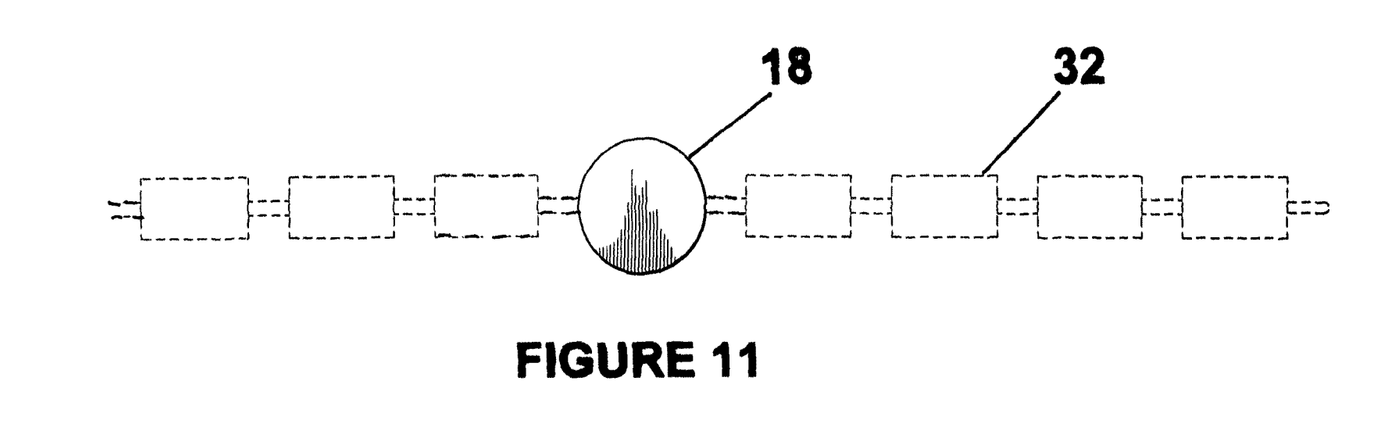
FIG. 11 provides alternative bracelet or necklace link design 20 including an embodiment 32 for an audible device means.
Figure 12:
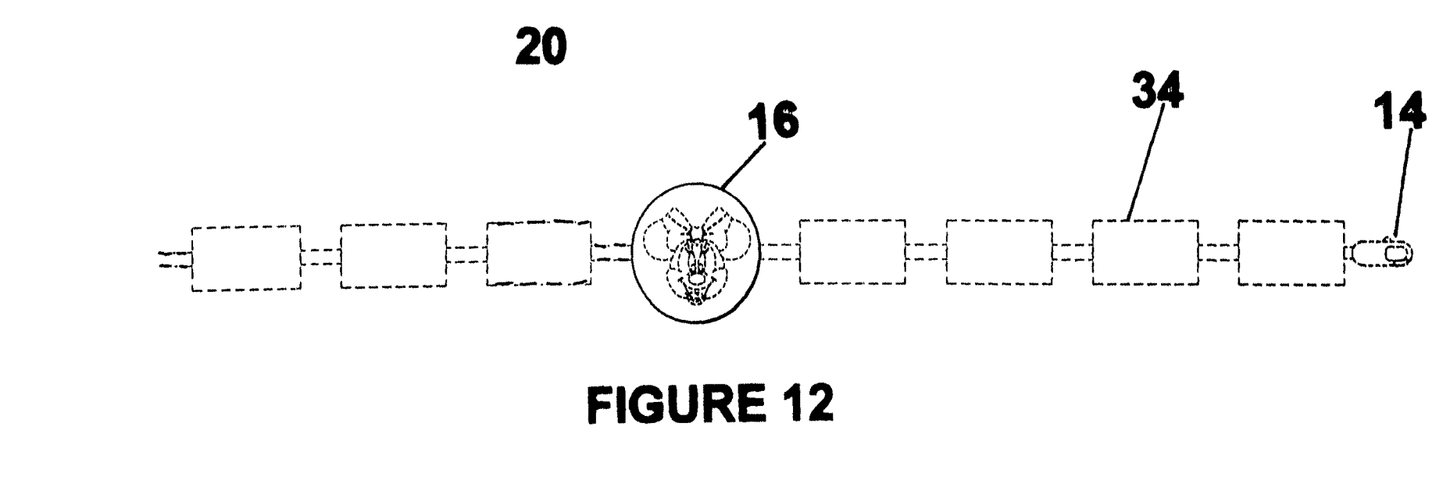
FIG. 12 provides alternative bracelet or necklace link design 20 including an embodiment 34 with visual alarm means.
Figure 13:
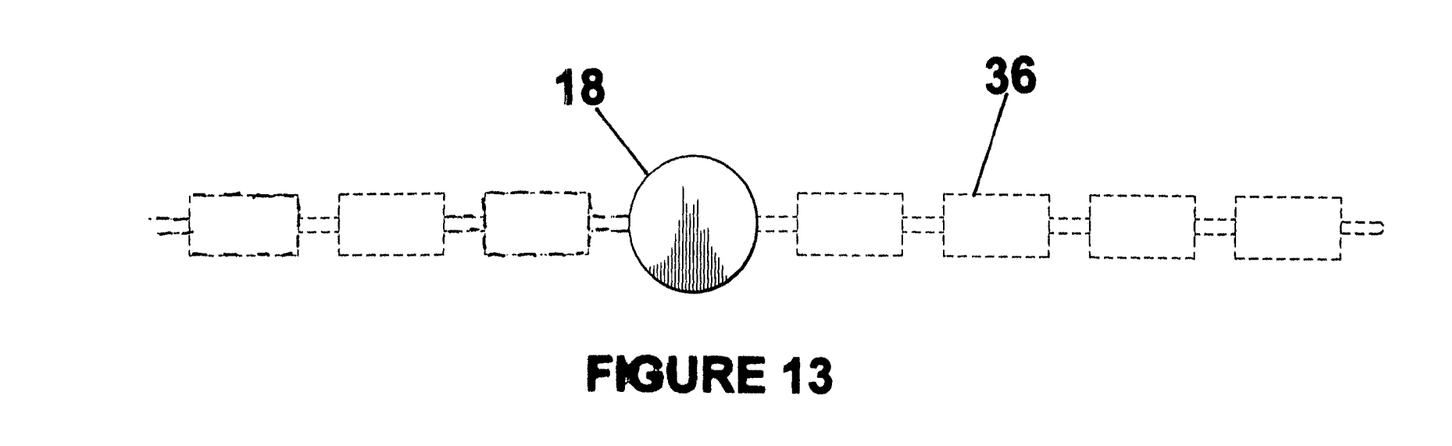
FIG. 13 provides alternative bracelet and necklace link design 20 including an embodiment 36 attachments design with a biomedical monitoring device attachment feature with audible alarm means.

The invention in yet a further embodiment can provide biomedical monitoring functions using devices in contact with the user's skin whereby the user's state of health can be detected using electronic control circuits 28 and data transmitting apparatus in the form of flexible electronic chips embedded in necklace or bracelet charms.

Figure 1:
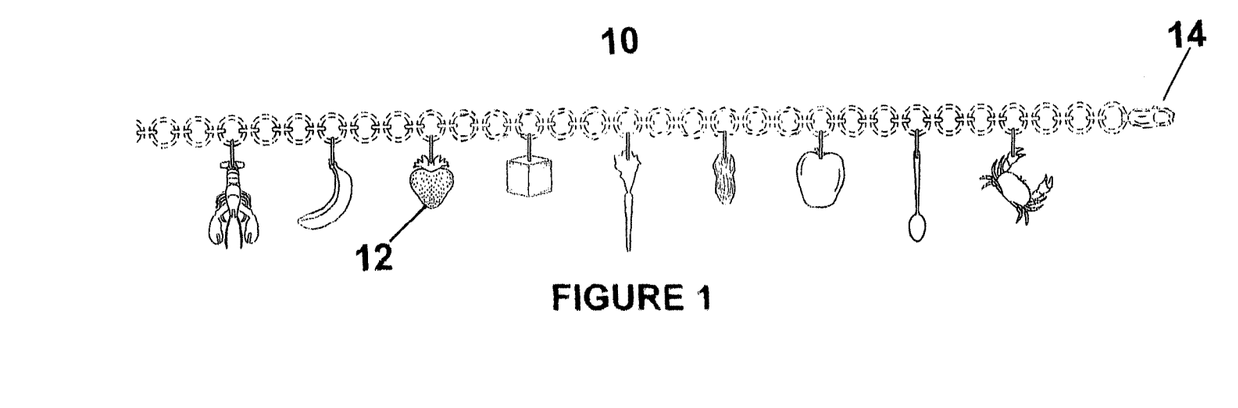
FIGS. 1 to 3 are examples of a bracelet or necklace design 10 comprising circular chain links, closure clasps and suspended charms attached to individual chain links for girls and for boys in for example but not limited to gold, platinum, or silver, elastic and hypo-allergic materials.
Figure 2:
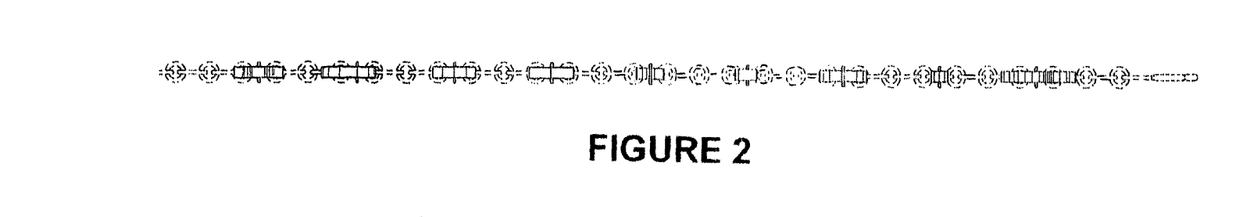
Figure 3:
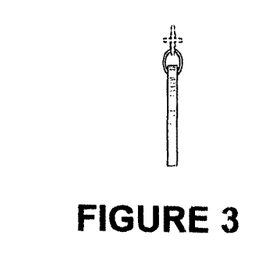
Figure 4:
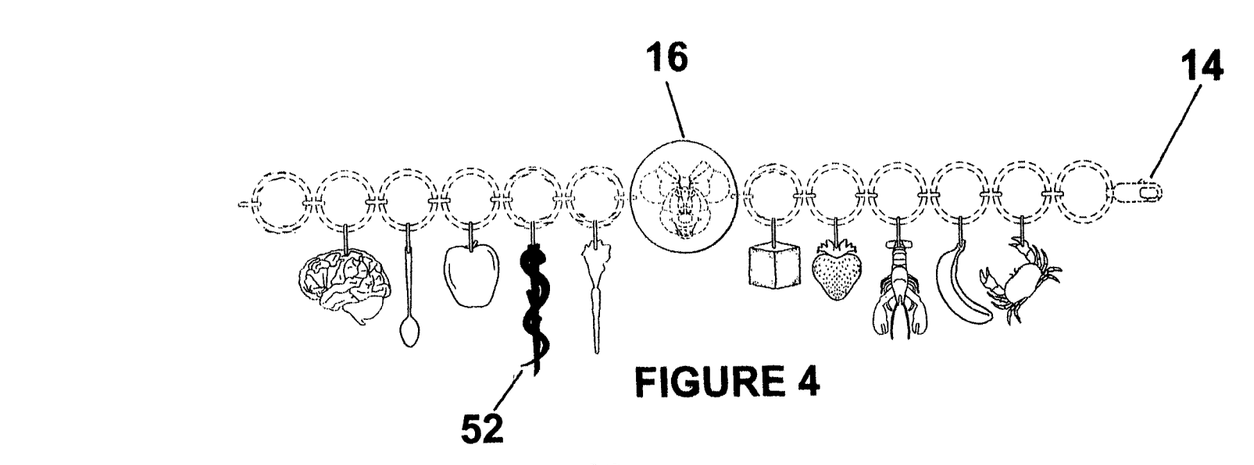
FIGS. 4 and 5 are examples of bracelet and necklace design 10 embodiments incorporating a child's favorite Cartoon or Sports character on one side of centrally placed cartoon, sports figure or sports logo 16 and with medical information 18 on the reverse side.
Figure 5:
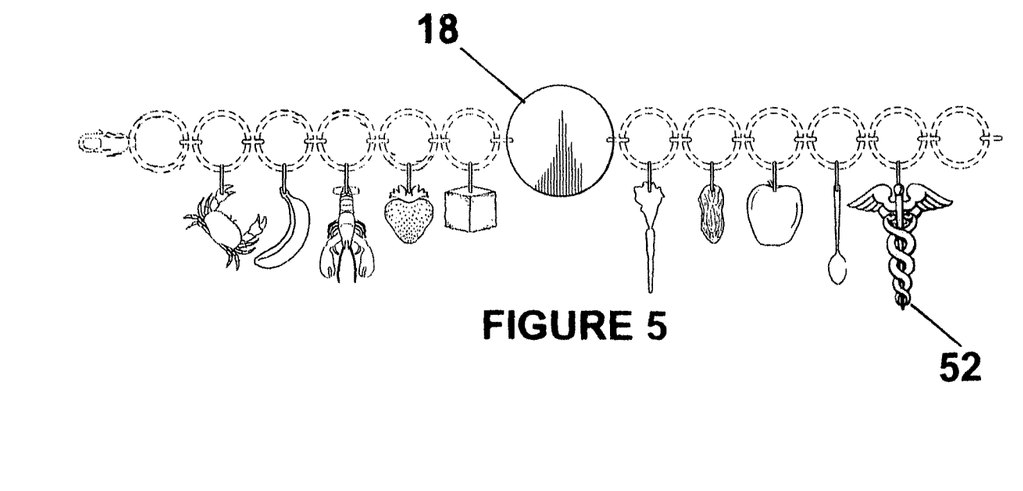
Figure 6:
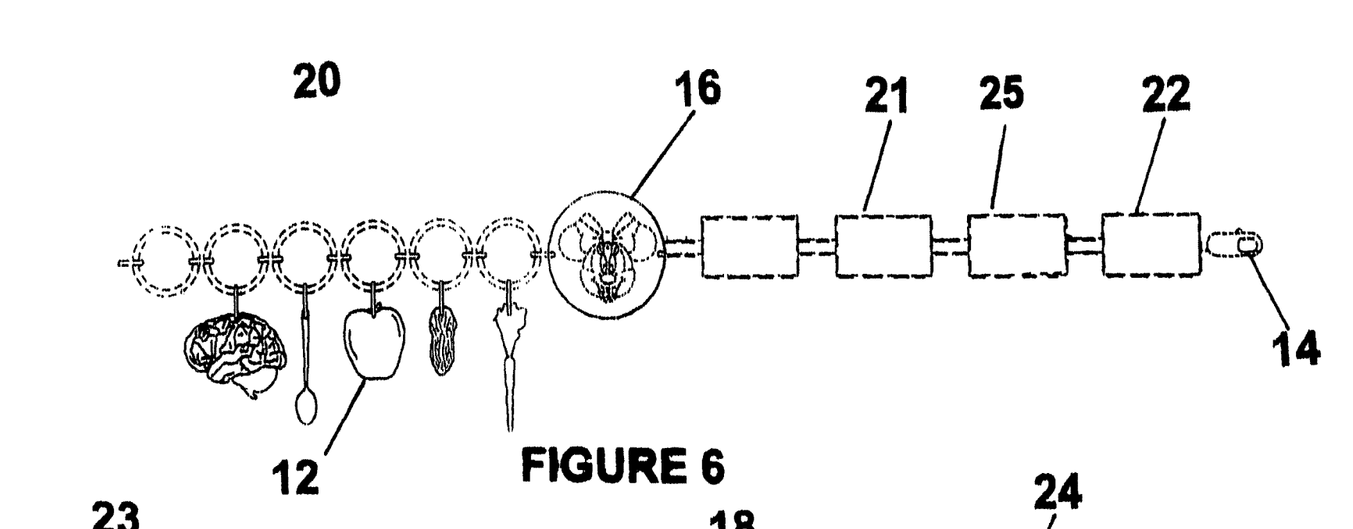
FIGS. 6 and 7 are examples of alternative bracelet and necklace link design 20 with charm link designs incorporating Cartoon or Sports character on one side of a centrally placed and with medical information on the reverse side and including specific attachment embodiments providing user allergy information 22 and electronic chip information 24. In addition, links 21 and 23 provide for independent stand-alone power supplies in the form of dc. battery power, and solar cell power respectively.
Figure 7:
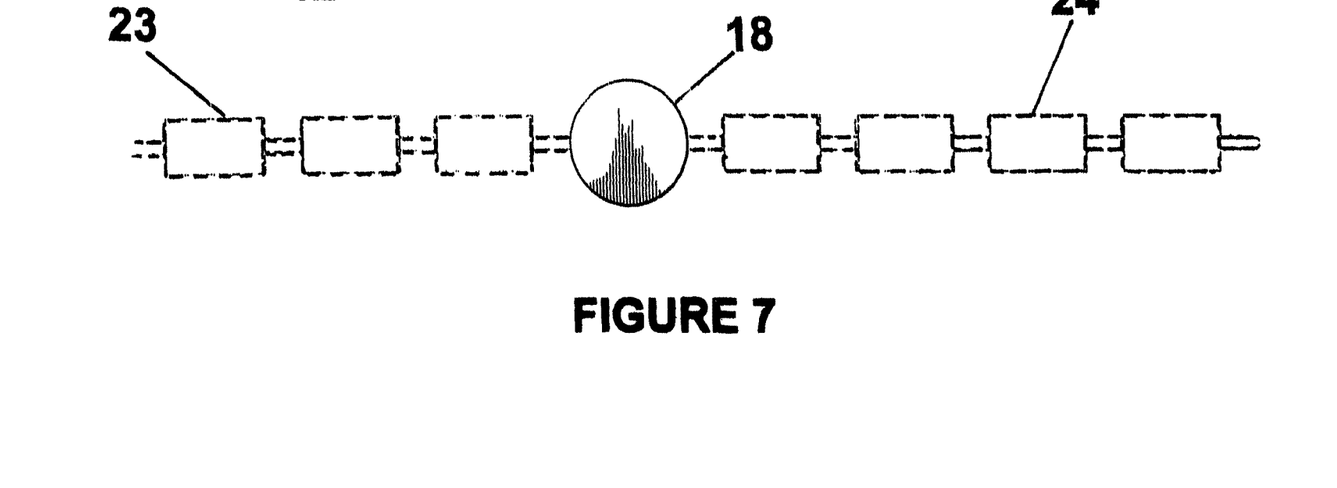
Figure 8:
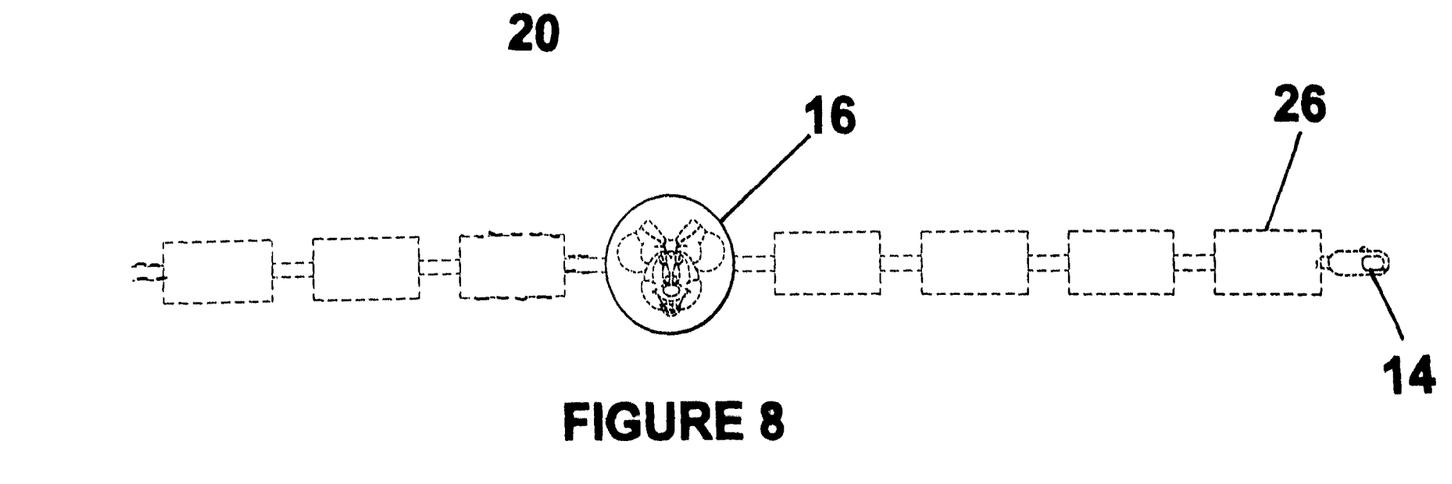
FIG. 8 provides an alternative bracelet or necklace link design 20 including an embodiment wherein an RFID or Infra Red device 26 is included.

The invention in yet a further embodiment can incorporate the use of RFID (Radio Frequency Identification) circuits 26 embedded in necklace or bracelets charms whereby by means of a transponder can emit a wireless signal representative of medical information stored in the said transponder and responsive to changes in the user's medical condition.

The individual components of the instant invention are capable of being constructed in a variety of materials, in the form of rare and valuable metals including gold, silver, sterling silver, platinum and various alloys thereof.

Further the individual components of the instant invention are also capable of being constructed in a variety of other materials, in the form of corrosion resistant metals including stainless steel, nickel and chromium alloys, titanium, copper, bronze, and alloys thereof.

Further the individual components of the instant invention are also capable of being constructed in a variety of other non metallic materials, in the form of for example, plastics, hardened plastic, fiberglass, and combinations thereof.

In yet a further invention design embodiment, the individual components of the bracelet, or necklace can be provided in a variety of metallic and non-metallic materials comprising elastomer hypoallergenic coatings.

It will be evident that the plurality of embodiments of the instant invention disclosed herewith have a multiplicity of applications including but not limited to combining a vast range of physically attractive charms with a broad range of means for relaying medical information relevant to the user's stable medical condition and importantly providing means for indicating important changes in the user's medical condition.

It will be evident that the instant invention Medical ID bracelets are different from other Medical ID bracelets because they have designed them with medical professionals/patients in mind based on experience from a Registered Nurse with ER experience.

Specifically when working in the Emergency Room, the patients are received both conscious and unconscious and it is necessary to work expeditiously to save lives, and when patients are transported to the hospital by ambulance, and arrive before their loved ones and relatives, pertinent information such as allergies to medications remain unknown.

It is evident from insights by contacts with numerous patients with health issues/allergies, that not wearing Medical ID bracelets results from the fact that visually Medical ID bracelets are ugly and unfashionable.

Recognizing these visual factors, the instant invention has created Medical ID bracelets where Medical needs information meets current Fashion trends, resulting in Medical ID bracelets that will be informative to Medical Staff and provide acceptable trendy fashion styles for both children, adolescents and adults.

It is well known medically, that nurses, and doctors can be visually informed by being able to assess medical conditions/allergies on unconscious patients, and with a quick glance at the lifesaving information in the form of a Medical ID bracelet, or necklace, proper treatment can be rendered accurately and promptly.

It is well understood that Fashion visual trends have a significant influence on children, adolescents, and adults in their lives, and an opportunity to select images, such as, Nickelodeon/Disney Characters and other media or sports team logos characters that they admire, in the form of Medical ID will be attractive and enhance self-esteem.

It is also well known that Children with chronic illnesses and allergies acquire self-esteem issues resulting from being the subject of bullying and feeling isolated and embarrassed about their condition. Therefore, Children with such medical conditions and allergies can be perceived inferior and different by their peers.

In the instant invention therefore, a Medical ID charm bracelet would allow Children and adolescents to display hanging embodiments from the bracelet displaying, for example, their favorite Nickelodeon/Disney Character, and at the same time disclosing preexisting medical conditions. In this manner, Children and adolescents would no longer feel ashamed to wear a medical ID bracelet and instead would have a sense of pride in showing their preference for favorite media or sports team logos and specific characters or players.

In addition, the instant invention by devising Medical ID link bracelets, or bracelets that are designed both for Children, adolescents and also adults, can afford adults the same opportunity to wear their favorite Sports Teams while at the same time disclosing pertinent medical information and thereby provide practically universal application benefits.

It will further be understood from the foregoing description that various modifications and changes can be readily incorporated in the preferred embodiments of the instant invention without departing from the essential inventive concept and from its true spirit.

This specification description and the accompanying drawings are intended for the purposes of illustration only and should not be construed in a limiting sense.

I claim:

1. A jewelry system for an infant or child user, the jewelry system comprising:
   a necklace comprising:
      a range of remotely accessible necklace links forming a chain having a first end and a second end, the chain including:
         a symbol charm comprising a first side and a second side, the first side including a pictorial presentation of a children's media character or a sports team logo, the second side including medical information of the user;
         a plurality of decorative attachments;
         information transfer means; and
         means for supplying electrical power; and
      a water tight clasp connecting the first end of the chain to the second end of the chain, thereby forming a closed loop; and a certificate that provides additional personal information of the user and authenticates that the pictorial presentation on the symbol charm is authentic.

2. The jewelry system of claim 1, wherein the pictorial presentation is in the form of a hologram.

3. The jewelry system of claim 1, wherein the medical information is formatted by etching and filled with light-reflecting fluorescent paint.

4. The jewelry system of claim 1, further comprising GPS location means.

5. A necklace for an infant or child user, the necklace comprising:
   a first plurality of links defining a first chain portion, the first chain portion having a first end and a second end;
   a second plurality of links defining a second chain portion, the second chain portion having a first end and a second end;
   a symbol charm removably affixed to the second end of the first chain portion and the first end of the second chain portion, thereby forming a continuous chain, the symbol charm comprising a first side and a second side, the first side including a pictorial presentation in the form of a hologram, the second side including medical information of the user, the medical information formatted by etching filled with light-reflecting fluorescent paint;
   information transfer means providing GPS location information;
   solar cells for supplying electrical power to the information transfer means; and
   a water tight clasp having a first clasp part and a second clasp part, the first clasp part being connected to the first end of the first chain portion, the second clasp part being connected to the second end of the second chain portion, the first and second clasp parts being connectable to each other to form a closed loop and allow the necklace to be worn around the neck of the user.

6. The necklace of claim 5, further comprising an electronic chip attachment for digitally transferring information related to the medical information of the user.

* * * * *